US011176320B2

(12) United States Patent
Carrier et al.

(10) Patent No.: US 11,176,320 B2
(45) Date of Patent: Nov. 16, 2021

(54) ASCRIBING GROUND TRUTH PERFORMANCE TO ANNOTATION BLOCKS

(71) Applicant: International Business Machines Corporation, Armonk, NY (US)

(72) Inventors: Scott Carrier, Apex, NC (US); Brendan Bull, Durham, NC (US); Dwi Sianto Mansjur, Cary, NC (US); Paul Lewis Felt, Springville, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 16/659,808

(22) Filed: Oct. 22, 2019

(65) Prior Publication Data

US 2021/0117507 A1 Apr. 22, 2021

(51) Int. Cl.
*G06F 40/169* (2020.01)
*G06F 40/226* (2020.01)
(Continued)

(52) U.S. Cl.
CPC .......... *G06F 40/226* (2020.01); *G06F 40/169* (2020.01); *G06F 40/30* (2020.01); *G06F 40/143* (2020.01)

(58) Field of Classification Search
CPC ....... G06F 40/169; G06F 40/143; G06F 40/30
See application file for complete search history.

(56) References Cited

U.S. PATENT DOCUMENTS 7,085,771 B2 * 8/2006 Chung .................. G06F 16/355
8,448,056 B2  5/2013 Pulsipher et al.
(Continued)

FOREIGN PATENT DOCUMENTS

WO   WO 2003098396   *  5/2003

OTHER PUBLICATIONS

Anonymous "A system and method for annotation of semantic relations that span multiple documents" IP.com;IPCOM000231089D (Sep. 25, 2013) 4 pages.
(Continued)

*Primary Examiner* — Feng-Tzer Tzeng
(74) *Attorney, Agent, or Firm* — Cantor Colburn LLP; Ryan Lewis (57) ABSTRACT

Examples described herein provide a computer-implemented method that includes receiving a ground truth associated with a domain cartridge, the domain cartridge comprising a plurality of hierarchical layers. The method further includes analyzing annotation blocks in relation to data present in the ground truth to detect any errors in a set of natural language processing annotators. The analyzing includes computing a recall score, a precision score, and an F1 score for each annotation block in a lowest level layer of the plurality of hierarchical layers. The analyzing further includes determining whether an error is detected at the lowest level layer of the plurality of hierarchical layers based at least in part on the recall score, the precision score, and the F1 score. The analyzing further includes terminating the analyzing responsive to determining that the error is detected at the lowest level layer of the plurality of hierarchical layers.

19 Claims, 5 Drawing Sheets

(51) Int. Cl.
*G06F 40/30* (2020.01)
*G06F 40/143* (2020.01)

(56) References Cited

U.S. PATENT DOCUMENTS

| | | | | |
|---|---|---|---|---|
| 8,751,921 | B2* | 6/2014 | Schormann | G06Q 10/10 |
| | | | | 715/232 |
| 9,201,985 | B2* | 12/2015 | Elias | G06F 16/9024 |
| 10,289,963 | B2 | 5/2019 | Chiticariu et al. | |
| 2009/0132907 | A1* | 5/2009 | Shao | G06F 40/143 |
| | | | | 715/234 |
| 2016/0314106 | A1* | 10/2016 | Carrier | G06F 40/189 |
| 2019/0114511 | A1 | 4/2019 | Gao et al. | |
| 2019/0114544 | A1 | 4/2019 | Sundaram et al. | |

OTHER PUBLICATIONS

Anonymous "Determining High-Level Topical Annotations for a Conversation" IP.com; IPCOM000252291D (Jan. 3, 2018) 34 pages.

Anonymous "Method and System for Providing Unsupervised Annotation of Isomorphic (Similar) Patterns to Accelerate Development of Ground Truth for Natural Language Processing Machine Learning Model" IP.com;IPCOM000257471D (Feb. 15, 2019) 2 pages.

Finkel et al., "Solving the problem of cascading errors: Approximate Bayesian inference for linguistic annotation pipelines" Proceedings of the 2006 Conference on Empirical Methods in Natural Language Processing; Association for Computational Linguistics (Jul. 2006) pp. 618-626.

Le et al. "Tackling error propagation through reinforcement learning: A case of greedy dependency parsing" Proceedings of the 15th Conference of the European Chapter of the Association for Computational Linguistics: vol. 1, Long Papers, Association for Computational Linguistics (Apr. 2017) pp. 677-687.

Vezzani et al. "Annotation collection and online performance evaluation for video surveillance: The visor project" 2008 IEEE Fifth International Conference on Advanced Video and Signal Based Surveillance. IEEE, (Sep. 2008) pp. 227-234.

* cited by examiner

ASCRIBING GROUND TRUTH PERFORMANCE TO ANNOTATION BLOCKS

BACKGROUND

The present invention generally relates to natural language processing, and more specifically, to ascribing ground truth performance to annotation blocks.

Natural language processing (NLP) is a field of computer science, artificial intelligence, and linguistics concerned with the interactions between computers and human (natural) languages. As such, NLP is related to the area of human-computer interaction, and especially with regard to natural language understanding that enables computers to derive meaning from human or natural language input.

Many NLP systems make use of ontologies to assist in performing NLP tasks. An ontology is a representation of knowledge. A semantic ontology, in the case of NLP, is a representation of knowledge of the relationships between semantic concepts. Created by humans, usually by domain experts, ontologies are never a perfect representation of all available knowledge. They can, for example, include biases to a particular subarea of a given domain and may reflect the level of knowledge or attention to detail of the author. Ontologies are usually task inspired (i.e., they have some utility in terms of managing information or managing physical entities) and their design reflects the task for which their terminology is required. Generally speaking, the tasks hitherto targeted have not been focused on the needs of applications for cognitive computing or natural language processing and understanding.

Ontologies are often represented or modeled in hierarchical structures in which portions of knowledge are represented as nodes in a graph and relationships between these portions of knowledge are represented as edges between the nodes. Examples of structures, such as taxonomies and trees, are limited variations, but generally speaking, ontology structures are highly conducive to being represented as a graph.

Examples of such semantic ontologies include the Unified Medical Language System (UMLS) semantic network for the medical domain, RXNORM for the drug domain, Foundational Model of Anatomy (FMA) for the human anatomy domain, and the like. The UMLS data asset, for example, consists of a large lexicon (millions) of instance surface forms in conjunction with an ontology of concepts and inter-concept relationships in the medical domain.

SUMMARY

Embodiments of the present invention are directed to ascribing ground truth performance to annotation blocks.

A non-limiting example computer-implemented method includes receiving, by a processing device, a ground truth associated with a domain cartridge, the domain cartridge comprising a plurality of hierarchical layers. The method further includes analyzing, by the processing device, annotation blocks in the plurality of hierarchical layers of the domain cartridge in relation to data present in the ground truth to detect any errors in a set of natural language processing annotators. The analyzing includes computing a recall score, a precision score, and an F1 score for each annotation block in a lowest level layer of the plurality of hierarchical layers. The analyzing further includes determining whether an error is detected at the lowest level layer of the plurality of hierarchical layers based at least in part on the recall score, the precision score, and the F1 score. The analyzing further includes terminating the analyzing responsive to determining that the error is detected at the lowest level layer of the plurality of hierarchical layers.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention enable ascribing ground truth performance to annotation blocks of hierarchical layers of a domain cartridge. This enables the introspection of a configuration-based annotator in order to flag a chain of causation for false positive/negative and true positive/negative occurrences.

Ground truth is a set of documents that are hand-curated by a subject matter expert or machine annotated. Ground truth provides the expected results for a given set of concepts that are desired to be detected. For example, if X number of procedures is expected, and an annotator is working perfectly, the ground truth indicates that X number of results is expected. If the annotator is working imperfectly, it may return more (i.e., X+1) or less (i.e., X−1) results. These are respectively referred to as false positives and false negatives. Ground truth is typically prescribed to the top-level annotation output. However, in scenarios where the annotation results from the configuration and contribution of one or more annotators, the chain of causation for a false positive/negative needs further analysis.

Embodiments of the invention address the shortcomings of the prior art by introspecting a domain cartridge to determine the hierarchical layers of the domain cartridge leading to the data present in the ground truth (e.g., covered text and metadata fields such as medical codes or whether annotation is negated, hypothetical, or contextually invalid). Embodiments described herein detect a data error in data present in a ground truth associated with a domain cartridge, which includes a plurality of hierarchical layers. Such embodiments further analyze annotation blocks in the hierarchical layers of the domain cartridge in relation to the data present in the ground truth. As an example, such analyzing includes computing a recall score, a precision score, and an F1 score for each annotation block in a lowest level layer and determining whether an error originated at the lowest level layer based at least in part on the recall score, the precision score, and the F1 score. The analysis then terminates or is repeated depending upon whether the error is detected at the lowest level. These and other aspects are described in more detail herein.

One or more embodiments of the present invention provide technological improvements over current methods of analyzing annotation block performance that do not assign blame to individual annotation blocks of hierarchical layers of a domain cartridge. As used herein, a "domain cartridge" refers to a hierarchical annotator, in which resulting annotations are built atop one or more other annotations. In some examples, the interdependencies of a hierarchical, layered annotator are known. In some examples, the hierarchy is configurable, and there is metadata available that enables accessing what the layers of the hierarchy are and whether each layer acts to produce a new annotation that would engage a higher layer or whether a layer filters/removes an annotation that a higher layer would ignore.

One or more embodiments of the present invention provide technical solutions to one or more of these disadvantages of existing solutions by improving the detection of errors in hierarchical layers of a domain cartridge. By detecting the location of errors (i.e., which annotator caused the error), the individual annotators and their respective layers can be improved. Through introspection of a hierarchical annotator (i.e., a domain cartridge) and assessing the accuracy of each layer of the hierarchical annotator with respect to the top-level ground truth, the present techniques aid NLP analysts/developers by highlighting how well each layer in the hierarchy is performing. For example, if there exists a dictionary annotator as the bottom layer of the hierarchy and its recall is 50%, the top-level recall will be at best 50% (unless there exist other annotators tagging concepts that also feed into the upper layers of the hierarchy). If many false positives are received, there are several layers that act to filter these out based on whether they appear within a specific section, or appear in a negated or hypothetical context, pertain to a different subject or option, the wrong part of speech, etc. The present techniques enable identifying which layer did not do its job in this respect. By assessing how the layers are performing, the present techniques address these issues efficiently and easily.

There is a distinction between addressing false negatives versus false positives. Given a top-level ground truth and a false negative instance, it is easier to determine which layer missed this particular detection. It is usually more difficult to assess which layer misfired in terms of a false positive (i.e., was the annotated term invalid, was it in a negated or hypothetical context, was it in the wrong section, etc.). Typically these details are unknown from a top-level ground truth. So, for false negatives (missing annotations), the culprit can typically be identified. However, for false positives, additional information in the ground truth or some level of ground truth may be needed for the underlying layers in order to identify the culprit. Otherwise, the potential culprits may need to be cited and adjudication of the culprit may be solicited from an NLP analysts. In some examples, true positives can be identified elsewhere in the ground truth corpus and/or a training set in an attempt to predict which layer (or multiple layers) was at fault given the occurrence of a false positive. It should be appreciated that the above examples of technical features, technical effects, and improvements to technology of example embodiments of the disclosure are merely illustrative and not exhaustive.

Figure 1:
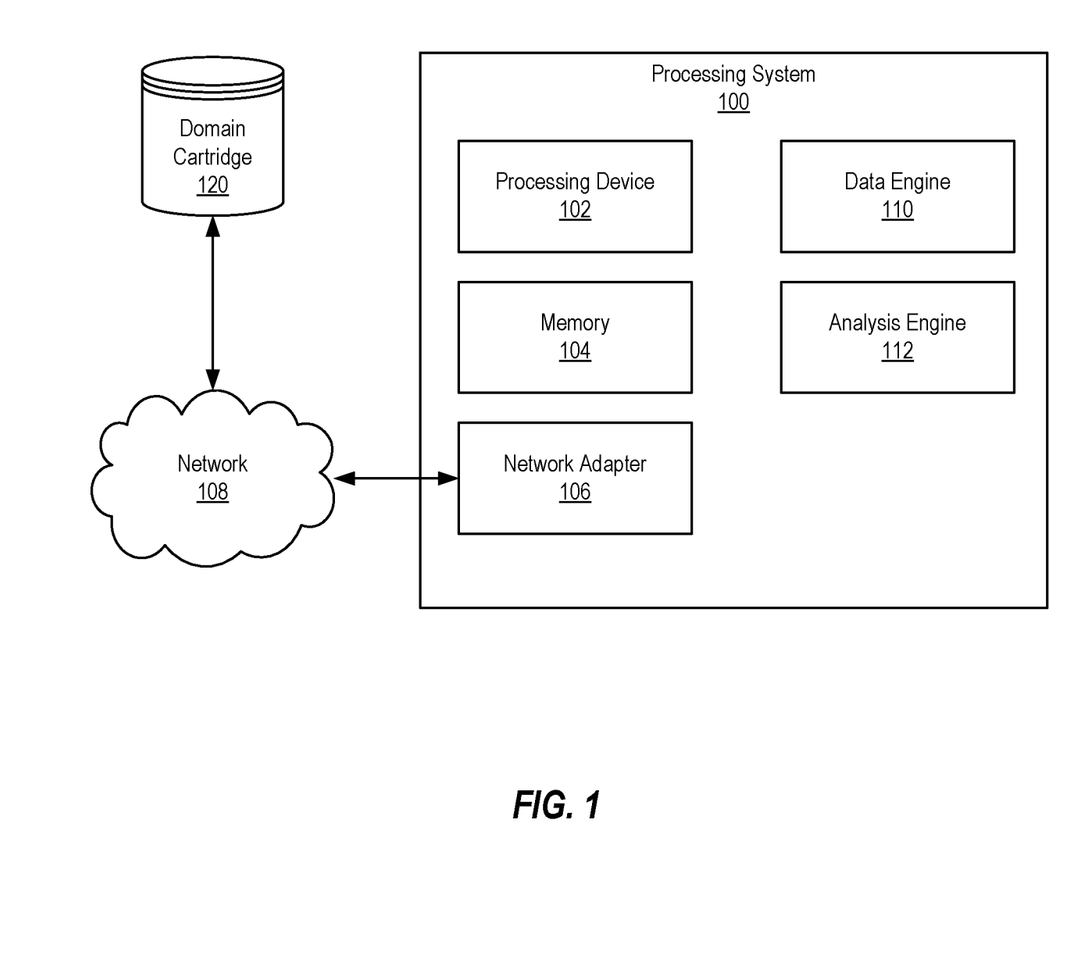
FIG. 1 depicts a block diagram of a processing system for ascribing ground truth performance to annotation blocks according to one or more embodiments described herein.

FIG. 1 depicts a block diagram of a processing system 100 for ascribing ground truth performance to annotation blocks according to one or more embodiments described herein. The processing system 100 includes a processing device 102, a memory 104, an data engine 110, and an analysis engine 112 configured and arranged as shown.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

As shown in FIG. 1, a domain cartridge 120 is accessible by or otherwise associated with the processing system 100. For example, the domain cartridge 120 is accessible via a network 108, discussed in more detail herein. The domain cartridge 120 includes a plurality of hierarchical layers. The domain cartridge 120 is introspected to determine the hierarchical layers leading to the data present in the ground truth. This can include, for example, covered text and metadata fields such as medical codes or whether annotation is negated, hypothetical, or contextually valid.

The data engine 110 receives a ground truth associated with the domain cartridge 120. The domain cartridge includes a plurality of hierarchical layers. One such example of hierarchical layers of a layered domain cartridge (e.g., the domain cartridge 120) is as follows, from lowest level to highest level. An example bottom layer is a concept detection dictionary layer, which annotates based on direct word matches (e.g., "hypertension"). An example next higher layer is an attribute set based on the concept dictionary layer followed by an attribute values from the concept value annotator layer. An example next higher layer is a negated true/false metadata from a negation annotator layer, which annotates based on negation (e.g., "no history of hypertension"). An example next higher level is a hypothetical true/false metadata from a hypothetical annotator, which annotates based on screening. An example highest layer is a selection metadata from a section annotator layer, which annotates based on a section of a document (e.g., a "family medical history" section).

The analysis engine 112 analyzes annotation blocks in the plurality of hierarchical layers of the domain cartridge in relation to data present in the ground truth to detect any errors in a set of natural language processing annotators. In other words, the analysis engine 112 determines the accuracy of the annotation layers (i.e., how the layers are performing with respect to the top layer). The analysis engine 112 calculates a recall score, a precision score, and an F1 score for the overall annotation as well as for each of the underlying layers.

The recall score is a ratio of correctly predicted positive observations to the total observations in a class. The recall score thus indicates how many of the expected results were detected. The recall score is not concerned with overmatching.

The precision score is a ratio of correctly predicted positive observations to the total predicted positive observations. The precisions score indicates how many of the detected observations are ones that were supposed to be detected (i.e., detected 10 but were only supposed to detect 7, detected 4 but were supposed to detect 7, etc.).

The F1 score is a weighted average of the recall score and the precision score and therefore accounts for both false positives and false negatives. Beyond computing accuracy scores for each layer of a domain cartridge, particular false positive/negative or true positive/negative can be analyzed and traced through the hierarchical layers within the cartridge.

Figure 5:
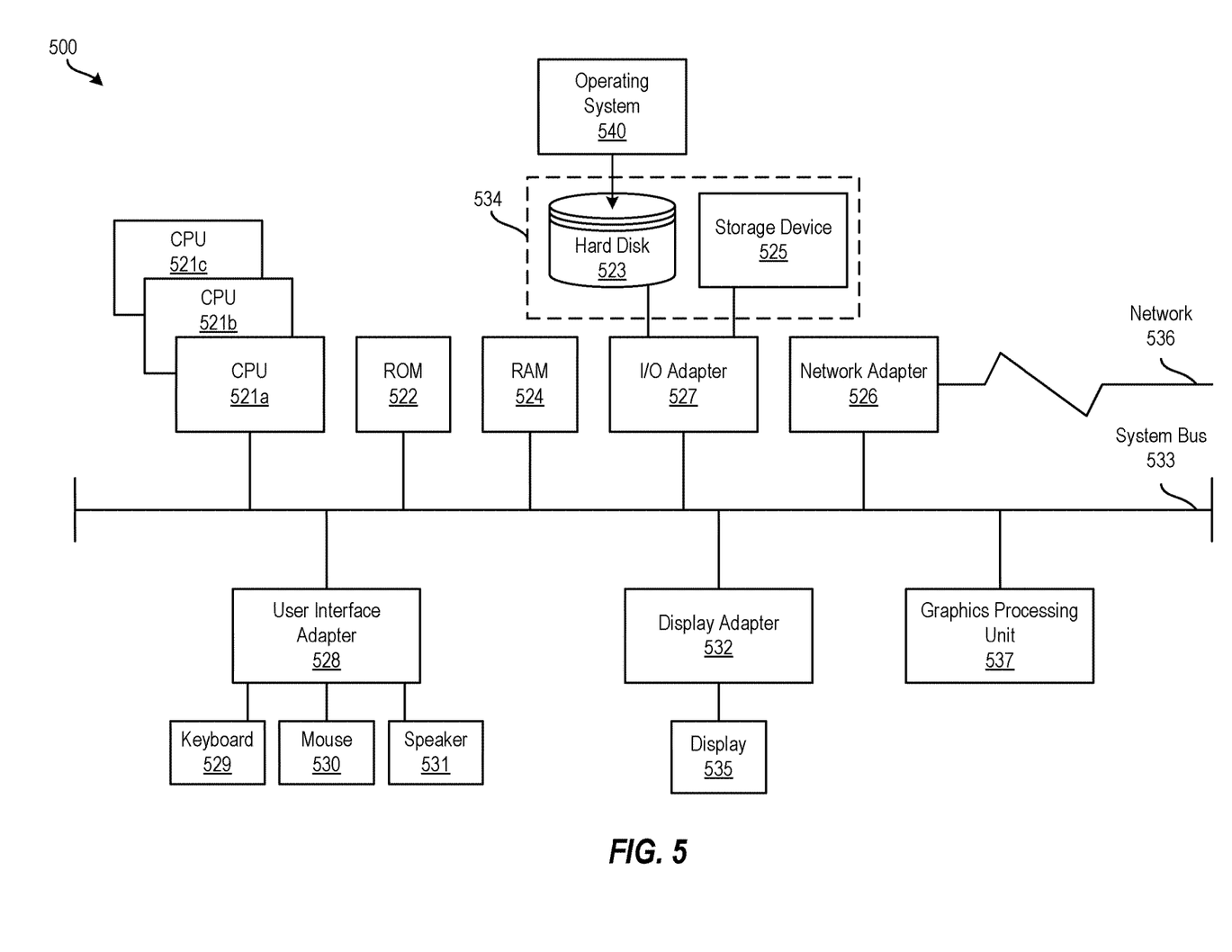
FIG. 5 depicts a block diagram of a processing system for implementing the presently described techniques according to one or more embodiments described herein.

The processing system 100 can further include a network adapter 106 (e.g., the network adapter 526 of FIG. 5). The network adapter 106 enables the processing system 100 to transmit data to and/or receive data from other sources, such as other processing systems, data repositories, and the like. As an example, the processing system 100 can transmit data to and/or receive data from a domain cartridge 120 directly and/or via the network 108.

The network 108 represents any one or a combination of different types of suitable communications networks such as, for example, cable networks, public networks (e.g., the Internet), private networks, wireless networks, cellular networks, or any other suitable private and/or public networks. Further, the network 108 can have any suitable communication range associated therewith and may include, for example, global networks (e.g., the Internet), metropolitan area networks (MANs), wide area networks (WANs), local area networks (LANs), or personal area networks (PANs). In addition, the network 108 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Figure 2:
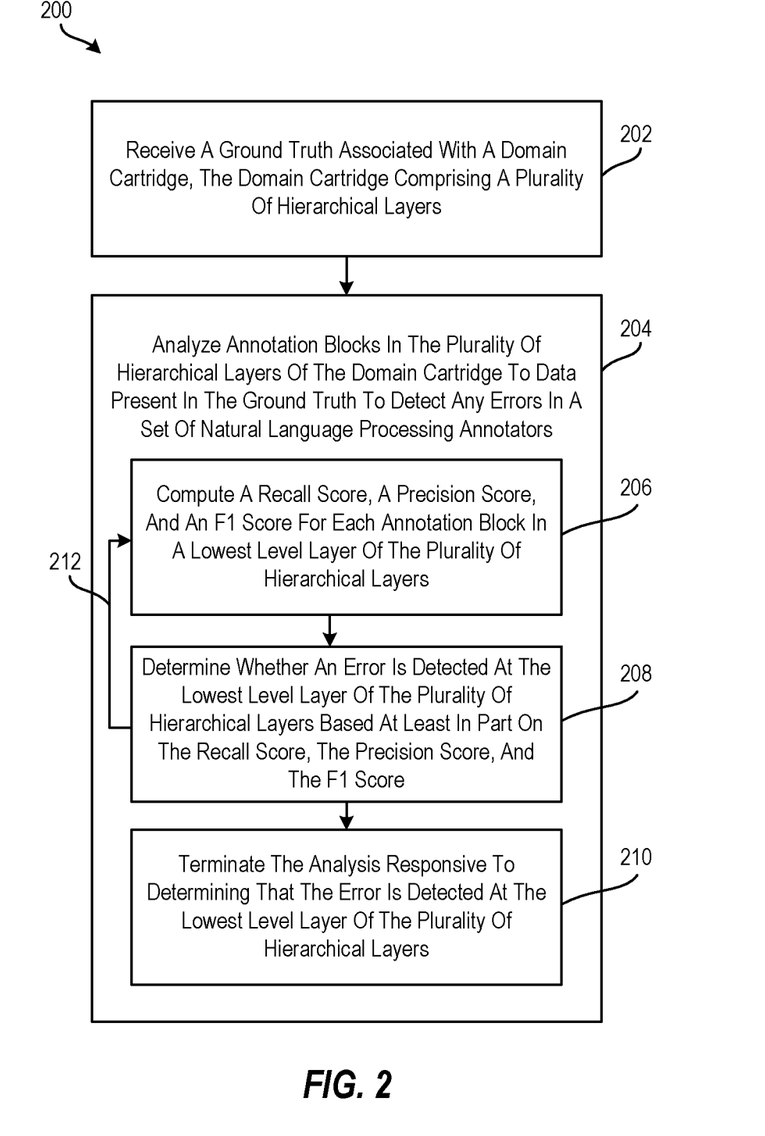
FIG. 2 depicts a flow diagram of a method for according to one or more embodiments described herein.

The features and functionality of the processing system 100 are now described with reference to FIG. 2 but are not so limited. In particular, FIG. 2 depicts a flow diagram of a method 200 for ascribing ground truth performance to annotation blocks according to examples of the present disclosure. The method 200 can be performed by any suitable processing system (e.g., the processing system 100, the processing system 500, etc.), any suitable processing device (e.g., the processing device 102, the processors 521, etc.), or the like and combinations thereof. The features and functionality of the processing system 100 are now described with reference to FIG. 2 but are not so limited.

At block 202, the data engine 110 receives a ground truth associated with the domain cartridge 120. The domain cartridge 120 includes a plurality of hierarchical layers. In examples, each of the plurality of hierarchical layers is generated by a different annotator of a set of natural language processing annotators.

At block 204, the analysis engine 112 analyzes annotation blocks in the plurality of hierarchical layers of the domain cartridge in relation to the data present in the ground truth. The analysis engine 112 performs the analysis as follows as shown in blocks 206, 208, and 210. In particular, at block 206, the analysis engine 112 computes a recall score, a precision score, and an F1 score for each annotation block in a lowest level layer of the plurality of hierarchical layers. The recall score is a ratio of correctly predicted positive observations to the total observations in a class. The precision score is a ratio of correctly predicted positive observations to the total predicted positive observations. The F1 score is a weighted average of the recall score and the precision score and therefore accounts for both false positives and false negatives.

At block 208, the analysis engine 112 determines whether an error is detected at the lowest level layer of the plurality of hierarchical layers based at least in part on the recall score, the precision score, and the F1 score. For example, if the recall score, the precision score, and/or the F1 score fall outside a desired threshold, the analysis engine 112 determines that an error is detected at the lowest layer. As an example regarding the recall score, if the recall score indicates that the ratio of correctly predicted positive observations to total observations is greater than the desired threshold, an error is determined to be detected at the lowest level layer of the domain cartridge. As an example regarding the precision score, if the precision score indicates that the ratio of correctly predicted positive observations to the total predicted positive observations is less than a desired threshold, an error is determined to be detected at the lowest level layer of the domain cartridge. As an example regarding the F1 score, if the F1 score indicates that the weighted average of the recall score and the precisions score is outside a desired range, an error is determined to be detected at the lowest level layer of the domain cartridge. In some examples, the determination of whether an error exists is based on one of the recall score, the precision score, and the F1 score; however, in other examples, the determination is based on one or more of the recall score, the precision score, and the F1 score.

At block 210, the analysis engine terminates the analysis responsive to determining that the error is detected at the lowest level layer of the plurality of hierarchical layers.

Additional processes also may be included, and it should be understood that the process depicted in FIG. 2 represents an illustration, and that other processes may be added or existing processes may be removed, modified, or rearranged without departing from the scope of the present disclosure. For example, the method 200 can repeat the analysis at block 204 responsive to determining that the error is not detected at the lowest level layer of the plurality of hierarchical layers (see arrow 212). In particular, the analysis is repeated at iteratively next higher level layers of the plurality of hierarchical layers responsive to determining that the error is not detected at the lowest level layer of the plurality of hierarchical layers. That is, the analysis is repeated iteratively at a next higher level layer of the plurality of hierarchical layers until it is determined that the error is detected. This enables analyzing the various layers of the domain cartridge 120 to determine in which layer an error originates. In some examples, the method includes computing a total recall score, a total precision score, and a total F1 score for the domain cartridge across each of the plurality of hierarchical layers.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
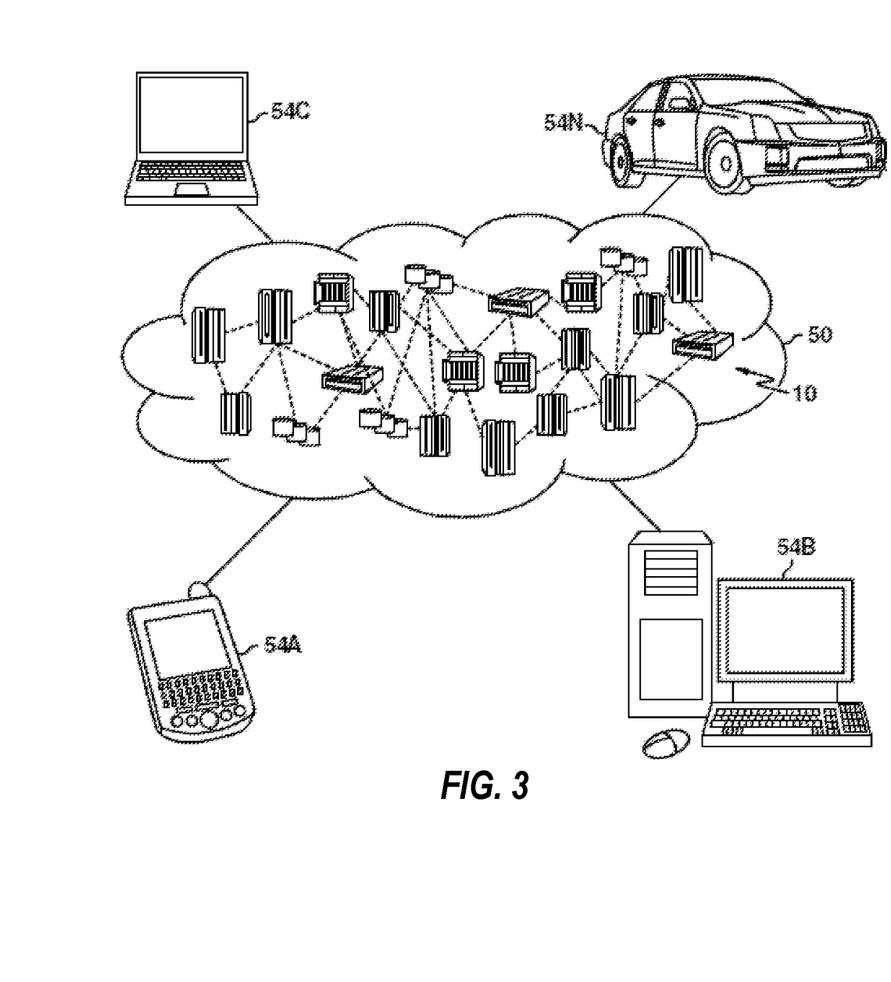
FIG. 3 depicts a cloud computing environment according to one or more embodiments described herein.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
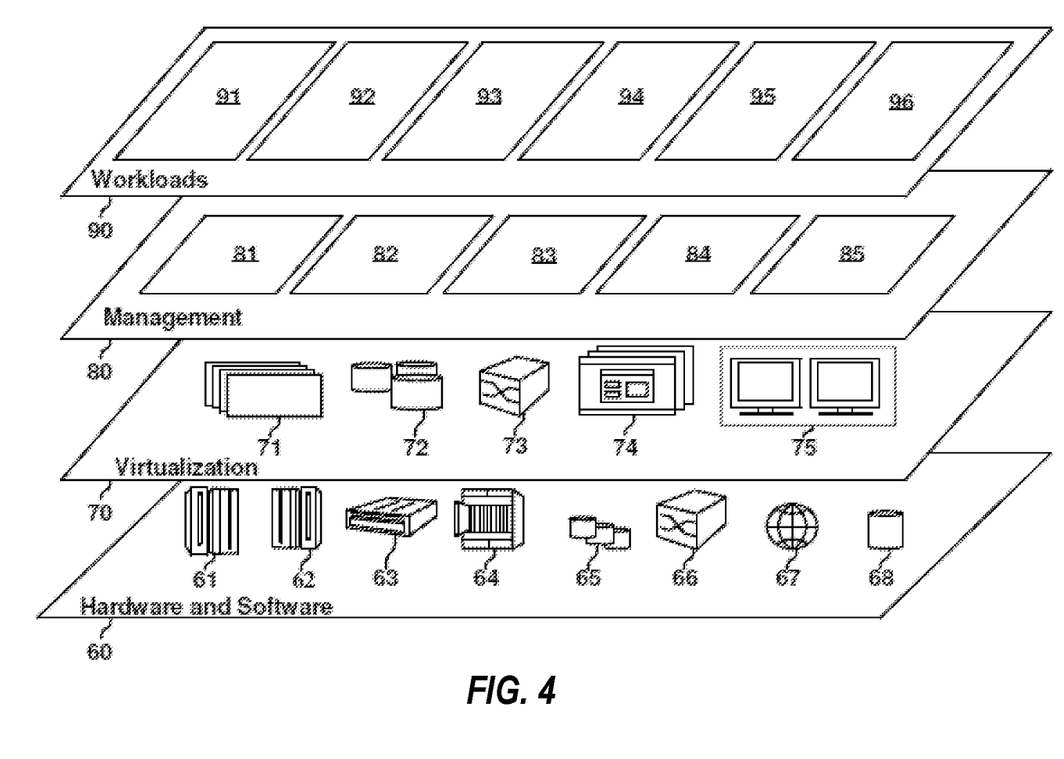
FIG. 4 depicts abstraction model layers according to one or more embodiments described herein.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ascribing ground truth performance to annotation blocks 96.

It is understood that one or more embodiments described herein is capable of being implemented in conjunction with any other type of computing environment now known or later developed. For example, FIG. 5 depicts a block diagram of a processing system 500 for implementing the techniques described herein. In accordance with one or more embodiments of the present invention, the processing system 500 is an example of a cloud computing node 10 of FIG. 3. In examples, processing system 500 has one or more central processing units ("processors" or "processing resources") 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of processing system 500.

Further depicted are an input/output (I/O) adapter 527 and a network adapter 526 coupled to system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display (e.g., a display monitor) 535 is connected to system bus 533 by display adapter 532, which may include a graphics adapter to improve the performance of graphics intensive applications and a video controller. In one aspect of the present disclosure, adapters 526, 527, and/or 532 may be connected to one or more I/O busses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 may be interconnected to system bus 533 via user interface adapter 528, which may include, for example, a Super I/O chip integrating multiple device adapters into a single integrated circuit.

In some aspects of the present disclosure, processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing, and has a highly parallel structure that makes it more effective than general-purpose CPUs for algorithms where processing of large blocks of data is done in parallel.

Thus, as configured herein, processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 524) and mass storage 534 collectively store the operating system 540 such as the AIX® operating system from IBM Corporation to coordinate the functions of the various components shown in processing system 500.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for ascribing ground truth performance to annotation blocks, the method comprising:
   receiving, by a processing device, a ground truth associated with a domain cartridge, the domain cartridge comprising a plurality of hierarchical layers, the plurality of hierarchical layers being generated by a set of natural language processing annotators; and
   analyzing, by the processing device, annotation blocks in the plurality of hierarchical layers of the domain cartridge in relation to data present in the ground truth to detect any errors in the set of natural language processing annotators, wherein the analyzing comprises:
      computing a recall score, a precision score, and an F1 score for each annotation block in a lowest level layer of the plurality of hierarchical layers;
      determining whether an error is detected at the lowest level layer of the plurality of hierarchical layers based at least in part on the recall score, the precision score, and the F1 score; and
      terminating the analyzing responsive to determining that the error is detected at the lowest level layer of the plurality of hierarchical layers,
   wherein the plurality of hierarchical layers comprises:
      a concept detection dictionary layer generated by a concept detection dictionary annotator using direct word matches;
      an attribute set layer generated based on the concept detection dictionary layer;
      an attribute values layer generated by a concept value annotator;
      a negated true/false metadata layer generated by a negation annotator;
      a hypothetical true/false metadata layer generated by a hypothetical annotator; and
      a section metadata layer generated by a section annotator.

2. The computer-implemented method of claim 1, wherein the analyzing further comprises:
   repeating the analyzing at a next higher level layer of the plurality of hierarchical layers responsive to determining that the error is not detected at the lowest level layer of the plurality of hierarchical layers.

3. The computer-implemented method of claim 2, wherein repeating the analyzing at a next higher level layer of the plurality of hierarchical layers is performed iteratively until it is determined that the error is detected.

4. The computer-implemented method of claim 1, wherein the analyzing further comprises:
   computing a total recall score, a total precision score, and a total F1 score for the domain cartridge across each of the plurality of hierarchical layers.

5. The computer-implemented method of claim 1, wherein the detected error is a false positive.

6. The computer-implemented method of claim 1, wherein the detected error is a false negative.

7. The computer-implemented method of claim 1, wherein the plurality of hierarchical layers are each generated by a different natural language processing annotator of the set of natural language processing annotators.

8. A system comprising:
   a memory comprising computer readable instructions; and
   a processing device for executing the computer readable instructions, the computer readable instructions controlling the processing device to perform operations comprising:
      receiving, by the processing device, a ground truth associated with a domain cartridge, the domain cartridge comprising a plurality of hierarchical layers, the plurality of hierarchical layers being generated by a set of natural language processing annotators; and
      analyzing, by the processing device, annotation blocks in the plurality of hierarchical layers of the domain cartridge in relation to data present in the ground truth to detect any errors in the set of natural language processing annotators, wherein the analyzing comprises:
         computing a recall score, a precision score, and an F1 score for each annotation block in a lowest level layer of the plurality of hierarchical layers;
         determining whether an error is detected at the lowest level layer of the plurality of hierarchical layers based at least in part on the recall score, the precision score, and the F1 score; and
         terminating the analyzing responsive to determining that the error is detected at the lowest level layer of the plurality of hierarchical layers,
      wherein the plurality of hierarchical layers comprises:
         a concept detection dictionary layer generated by a concept detection dictionary annotator using direct word matches;
         an attribute set layer generated based on the concept detection dictionary layer;

an attribute values layer generated by a concept value annotator;

a negated true/false metadata layer generated by a negation annotator;

a hypothetical true/false metadata layer generated by a hypothetical annotator; and a section metadata layer generated by a section annotator.

9. The system of claim 8, wherein the analyzing further comprises:

repeating the analyzing at a next higher level layer of the plurality of hierarchical layers responsive to determining that the error is not detected at the lowest level layer of the plurality of hierarchical layers.

10. The system of claim 9, wherein repeating the analyzing at a next higher level layer of the plurality of hierarchical layers is performed iteratively until it is determined that the error is detected.

11. The system of claim 8, wherein the analyzing further comprises:

computing a total recall score, a total precision score, and a total F1 score for the domain cartridge across each of the plurality of hierarchical layers.

12. The system of claim 8, wherein the detected error is a false positive.

13. The system of claim 8, wherein the detected error is a false negative.

14. The system of claim 8, wherein the plurality of hierarchical layers are each generated by a different natural language processing annotator of the set of natural language processing annotators.

15. A computer program product comprising a computer readable storage medium having program instructions embodied therewith, the program instructions executable by a processing device to cause the processing device to perform operations comprising:

receiving, by the processing device, a ground truth associated with a domain cartridge, the domain cartridge comprising a plurality of hierarchical layers, the plurality of hierarchical layers being generated by a set of natural language processing annotators; and analyzing, by the processing device, annotation blocks in the plurality of hierarchical layers of the domain cartridge in relation to data present in the ground truth to detect any errors in the set of natural language processing annotators, wherein the analyzing comprises:

computing a recall score, a precision score, and an F1 score for each annotation block in a lowest level layer of the plurality of hierarchical layers;

determining whether an error is detected at the lowest level layer of the plurality of hierarchical layers based at least in part on the recall score, the precision score, and the F1 score; and terminating the analyzing responsive to determining that the error is detected at the lowest level layer of the plurality of hierarchical layers, wherein the plurality of hierarchical layers comprises:

a concept detection dictionary layer generated by a concept detection dictionary annotator using direct word matches;

an attribute set layer generated based on the concept detection dictionary layer;

an attribute values layer generated by a concept value annotator;

a negated true/false metadata layer generated by a negation annotator;

a hypothetical true/false metadata layer generated by a hypothetical annotator; and a section metadata layer generated by a section annotator.

16. The computer program product of claim 15, wherein the analyzing further comprises:

repeating the analyzing at a next higher level layer of the plurality of hierarchical layers responsive to determining that the error is not detected at the lowest level layer of the plurality of hierarchical layers.

17. The computer program product of claim 16, wherein repeating the analyzing at a next higher level layer of the plurality of hierarchical layers is performed iteratively until it is determined that the error is detected.

18. The computer program product of claim 15, wherein the analyzing further comprises:

computing a total recall score, a total precision score, and a total F1 score for the domain cartridge across each of the plurality of hierarchical layers.

19. The computer program product of claim 15, wherein the detected error is a false positive.

* * * * *